(12) United States Patent
Purcell et al.

(10) Patent No.: US 6,752,117 B2
(45) Date of Patent: Jun. 22, 2004

(54) BALANCER SHAFT ASSEMBLY

(75) Inventors: John Jerl Purcell, Billingham (GB); Richard Kettle, Slough (GB); Chris Swaby, Marlow (GB)

(73) Assignees: Cummins Engine Company, Ltd., Darlington (GB); Iveco (UK) Ltd., Watford (GB); New Holland UK, Ltd., Basildon (GB)

( * ) Notice: Subject to any disclaimer, the term of this patent is extended or adjusted under 35 U.S.C. 154(b) by 0 days.

(21) Appl. No.: 10/205,840

(22) Filed: Jul. 26, 2002

(65) Prior Publication Data

US 2003/0106518 A1 Jun. 12, 2003

(30) Foreign Application Priority Data

Jul. 28, 2001 (GB) .............................................. 0118478

(51) Int. Cl.[7] .............................................. F02B 75/06
(52) U.S. Cl. .................................. 123/192.2; 123/196 R
(58) Field of Search ............................ 123/192.2, 196 R

(56) References Cited

U.S. PATENT DOCUMENTS 4,856,486 A * 8/1989 Mori et al. ............... 123/192.2

* cited by examiner

*Primary Examiner*—Noah P. Kamen
(74) *Attorney, Agent, or Firm*—Woodard, Emhardt, Moriarty, McNett & Henry LLP

(57) ABSTRACT

A balancer shaft assembly for an engine comprises a housing mountable on the engine block, and rotatably supporting at least one balancer shaft (16,18; 16',18') connectable for rotation with the engine crankshaft. The housing is formed in two parts (12,14; 12',14') and defines pillar blocks (30) for journalling the or each balancer shaft (16,18; 16',18'). A groove (28; 28') is formed in the split plane of at least one of the two mating parts (12; 12') of the housing, which groove (28; 28') when the parts (12,14; 12',14') are mated to one another defines an oil gallery by way of which lubricant is supplied to the pillar blocks (30) supporting the or each balancer shaft (16,18; 16',18').

9 Claims, 6 Drawing Sheets

BALANCER SHAFT ASSEMBLY

FIELD OF THE INVENTION

This invention relates to balancer shaft assemblies for internal combustion engines.

Balancer shafts are provided in reciprocating engines to counteract vibration associated with large rotating masses. The shafts are driven by the crankshaft, such that the vibrations generated by eccentric weights on the balancer shafts exactly oppose the vibrations caused by the reciprocating pistons. The overall effect is to reduce engine noise and wear on engine mounts and other drivetrain components.

BACKGROUND OF THE INVENTION

It is usually accepted that the shafts are located such that their axes lie in a plane containing the axis of the crankshaft, but due to engine layout and vehicle size, such a configuration may not always be ideal. EP-A-0.789.165 discloses a lubricating structure for rotary balancer shafts wherein a housing comprises two pieces which vertically sandwich the balancer shafts. The whole structure is then bolted to the engine block below the plane of the crankshaft.

The balancer shafts need to be lubricated in the same way as any other rotating engine component. Conventionally, this has been accomplished by providing drilled oil galleries within the framework or block supporting the balancer shafts. Oil flows from the galleries through exit holes in the pillar blocks to form a layer of lubricating oil between the pillar blocks and the journals on the balancer shaft. This is similar to crankshaft lubrication, and in turn is as expensive and time consuming to fabricate.

OBJECT OF THE INVENTION

The present invention seeks to provide a more cost effective manner of supplying oil to lubricate the balancer shaft journals.

SUMMARY OF THE INVENTION

According to the present invention there is provided a balancer shaft assembly for an engine, comprising a housing mountable on the engine block, and rotatably supporting at least one balancer shaft connectable for rotation with the engine crankshaft, the housing being formed in two parts and defining pillar blocks for journalling the, or each balancer shaft.

The assembly is characterised in that a groove is formed in the split plane of at least one of the two mating parts of the housing, which groove, when the parts are mated to one another, defines an oil gallery by way of which lubricant is supplied to pillar blocks supporting the or each balancer shaft.

The invention has the advantage of reducing cost of production as the machining process for creating oil pathways inside the balancer shaft is time consuming and expensive. By providing the oil galleries on the mating surface of the housing, they can be cast as an integral part of the housing.

It is further advantageous to construct the housing as an open ladder frame, thereby reducing weight and making construction more simple. This may however affect rigidity, so with this in mind, the bottom half of the two part ladder frame housing may be formed with reinforcing webs to define a closed drip/splash tray. The webs are provided with drainage holes so that oil is not prevented from falling from the engine and balancer shaft above into the sump below. The webs thus substantially increase the rigidity of the ladder frame housing structure without interfering with the return of oil to the sump. This strengthening in turn adds rigidity to the engine block, by bracing it when the balancer assembly is bolted in place.

In a preferred embodiment of the invention, two counter-rotating balancer shafts are provided. In this case, in order to reduce the number of parts, it is desirable to form the two balancer shafts so that they are identical to each other.

To drive the balancer shafts in opposite directions, it is possible to drive a first shaft at one end by means of a cog driven by the engine and to drive the other balancer shaft by means of a cog mounted on the other end of the first shaft and meshing with an identical cog on the second shaft.

It is preferred, however, to drive the same ends of both balancer shafts. This may be achieved by providing a cog on the first shaft that meshes directly with an engine driven cog and a cog on the second shaft that is driven by the same engine driven cog through an idler gear so as to reverse the direction of rotation of the second balancer shaft relative that of the first balancer shaft.

When the housing is constructed as an open ladder frame, it is possible to provide oil galleries that form a continuous closed loop around the periphery of the split plane, so that lubricant can follow along more than one path (clockwise and counter-clockwise) in order to reach any given bearing. It has been found in practice however that this can result in an excessive drop in the oil pressure (because of increased leakage) and it is preferred to form discontinuous galleries in the split plane of the housing so that oil can follow only a single path in order to reach any given bearing.

With the housing constructed as a ladder network, wherein each rung of the ladder defines two pillar blocks, one for each balancer shaft, it would be possible to interrupt the galleries along the rungs between the two pillar blocks. In this case, each of the galleries running along the stiles of the ladder will carry lubricant to the bearings of a respective one of the two balancer shafts but not the other.

In the preferred embodiment of the invention, however, the pillar blocks on each rung are connected to one another by a lubricant passage formed in the rung, but an oil gallery is formed in only one of the two stiles.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
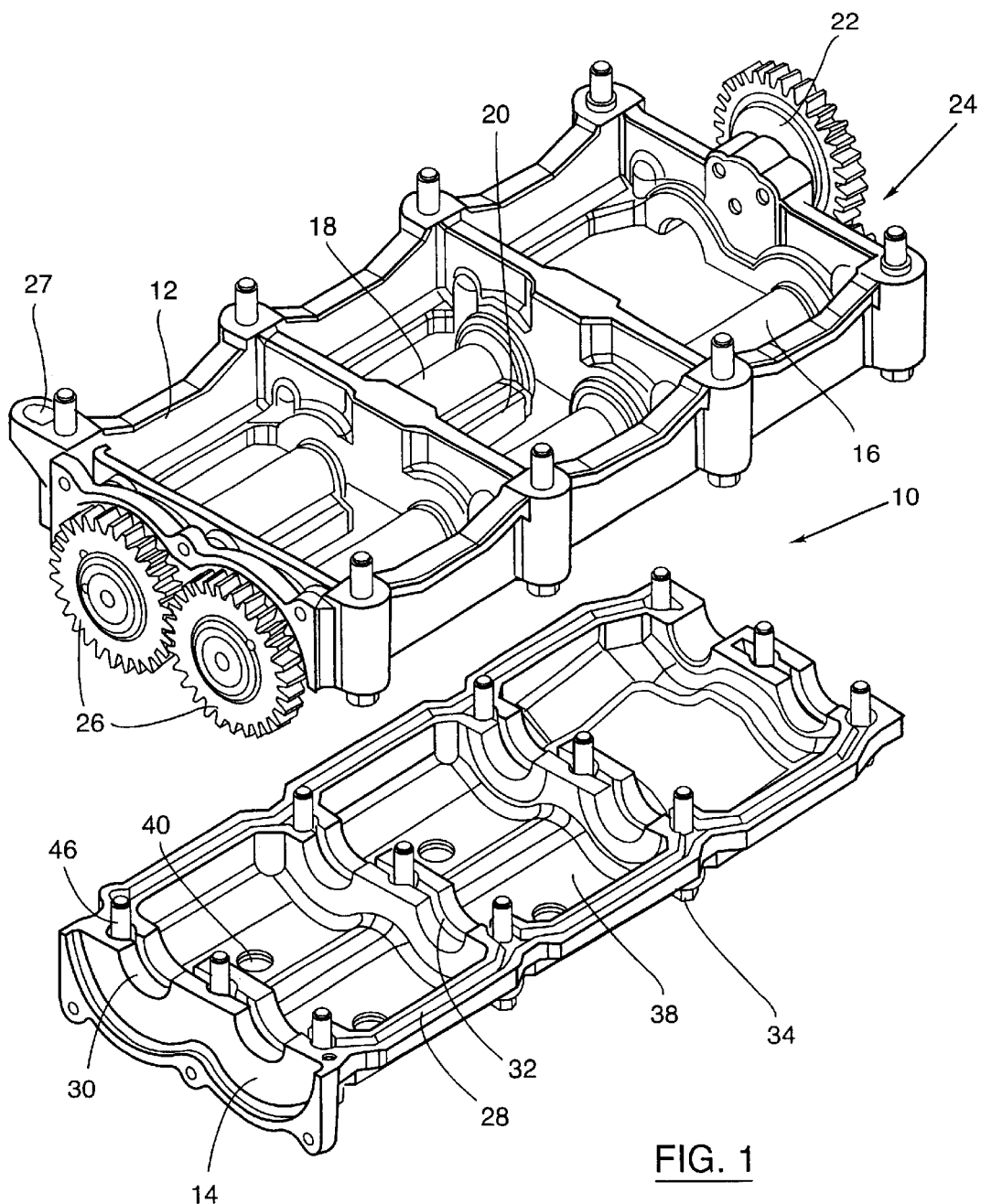
FIG. 1 is an exploded view of a first embodiment of a balancer shaft assembly prior to assembly.
Figure 2:
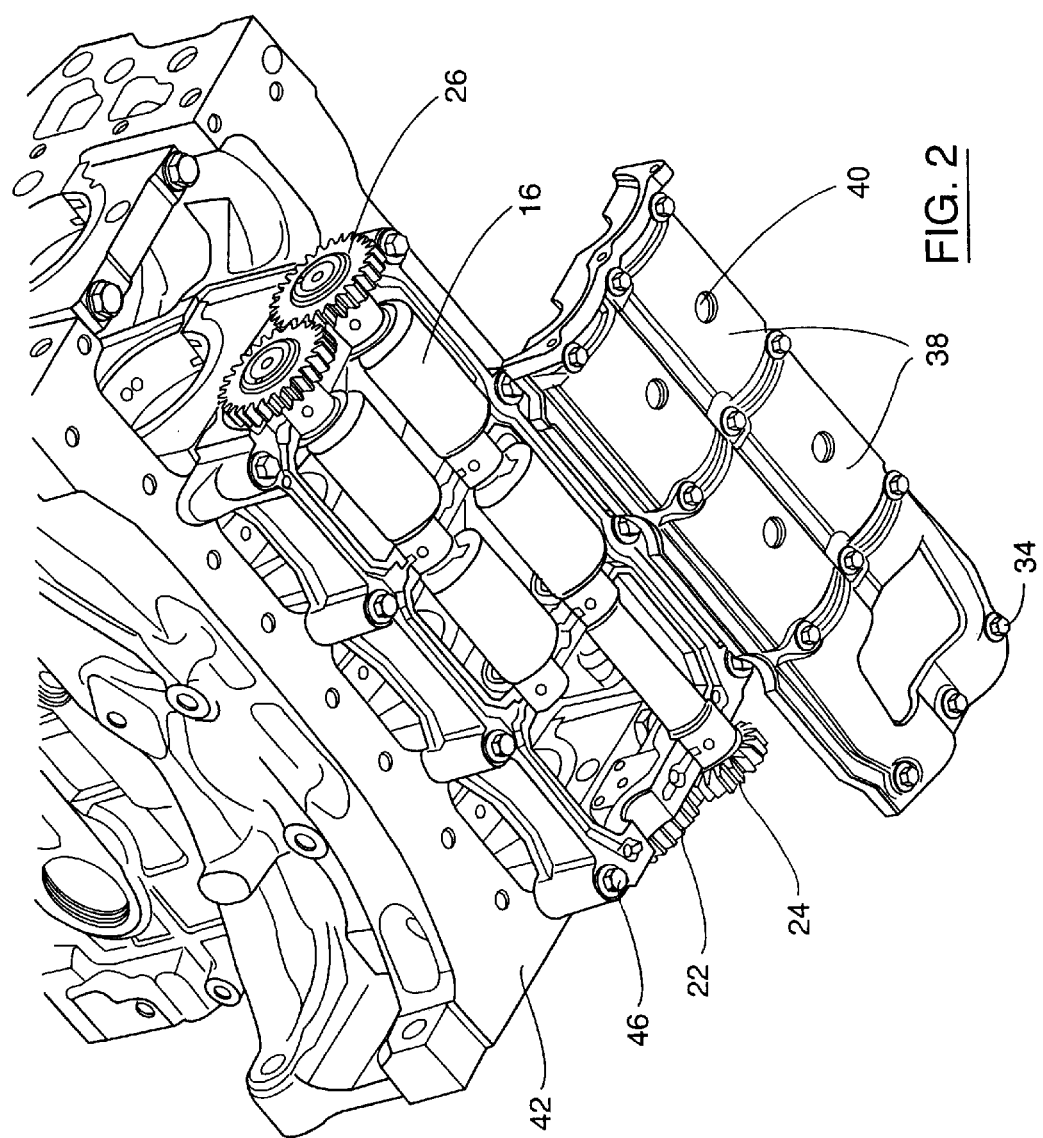
FIG. 2 shows the upper part of the housing complete with balancer shafts in place on the engine block, prior to the attachment of the lower part of the housing.
Figure 3:
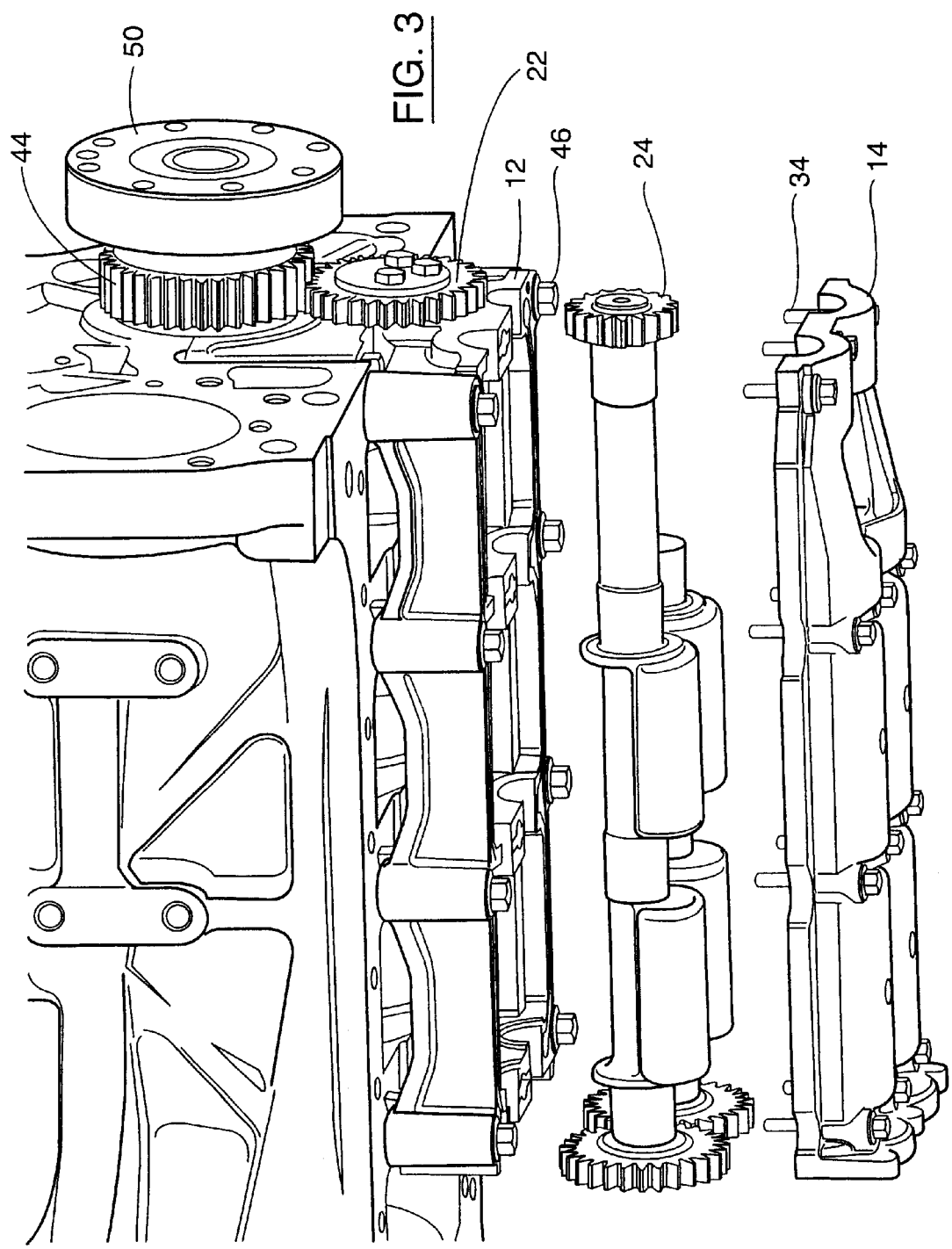
FIG. 3 shows an exploded side view of the assembly of FIGS. 1 and 2, with the housing part secured to the engine block and prior to the attachment of the lower housing part.

The balancer shaft assembly 10 of a first embodiment of the invention, as shown in FIGS. 1 to 3, comprises an upper housing part 12 and a lower housing part 14. The housing parts 12 and 14 are ladder like in structure. The "rungs" of the ladder have pillar blocks 30 integrally formed therein, for receiving balancer shafts 16 and 18. Balancer shafts 16 and 18 are metal shafts, having eccentric weights which create a vibration when the shafts are rotated.

When housing parts 12 and 14 are bolted to one another, the journal sections of the balancer shafts 16 and 18 are rotatably located between the two halves of the pillar blocks 30 such that the axes of the shafts 16 and 18 are parallel to the "stiles" of the ladder frame. Bearing shells (not shown) may be provided between the journals of the balancer shaft 16 and 18 and the pillar blocks 30.

Grooves 28 are machined or more preferably cast in the mating surfaces of upper and lower housing parts 12 and 14, such that when brought together to encase the balancer shafts 16 and 18, oil channels or galleries are formed in the split plane of the housing. These channels incorporate a groove 32 in each pillar block 30, such that when assembled the journals of balancer shafts 16 and 18 rotate in a film of lubricating oil supplied to the oil channels 28. Oil is supplied to the oil galleries 28 in the balancer shaft assembly through supply ducts (not shown) formed in the engine block 42 and through a conduct 27 provided in the upper housing part 12.

FIG. 1 shows an embodiment having two balancer shafts. Gears 26 are axially mounted on the ends of each balancer shaft 18, which protrude beyond one end of the housing parts 12 and 14. The teeth of gears 26 are in constant mesh with each other so that rotation of the first shaft 16 causes the second shaft 18 to counter rotate at the same speed. The first balancer shaft 16 is longer than the second balancer shaft 18 by an amount equal to the distance between two rungs and protrudes additionally from the opposite end of the housing. To drive the two shafts 16 and 18, a gear 24 is mounted on the projecting end of the first balancer shaft 16 and meshes with an engine driven cog 22.

When the balancer shaft assembly is mounted on the bottom of the engine block 42, the cog 22 meshes with and is driven by a cog 44 arranged on the engine crankshaft behind the mounting plate 50 for the flywheel (not shown). Flywheel gear 44 may be an integral part of the flywheel mounting plate 50, or it may be formed as a separate gear secured in fixed angular position to the crankshaft.

FIG. 2 shows upper housing part 12 bolted to engine block 42 using bolts 46. Lower housing part 14 is then bolted to upper housing part 12 using bolts 34, encasing balancer shafts 16 and 18 as previously described. Lower housing part 14 is not strictly a ladder frame structure as it includes webs 38 as shown in FIGS. 1 and 2 to convert it to a tray. The webs 38 are formed with drainage holes 40, which allow oil from the crankcase to drip through the tray towards the engine sump (not shown), the latter being secured to the engine block 42 around the balancer shaft assembly 10. The webs 38 add rigidity by bracing the lower part of the housing without impeding the escape of oil back to the sump.

Figure 4:
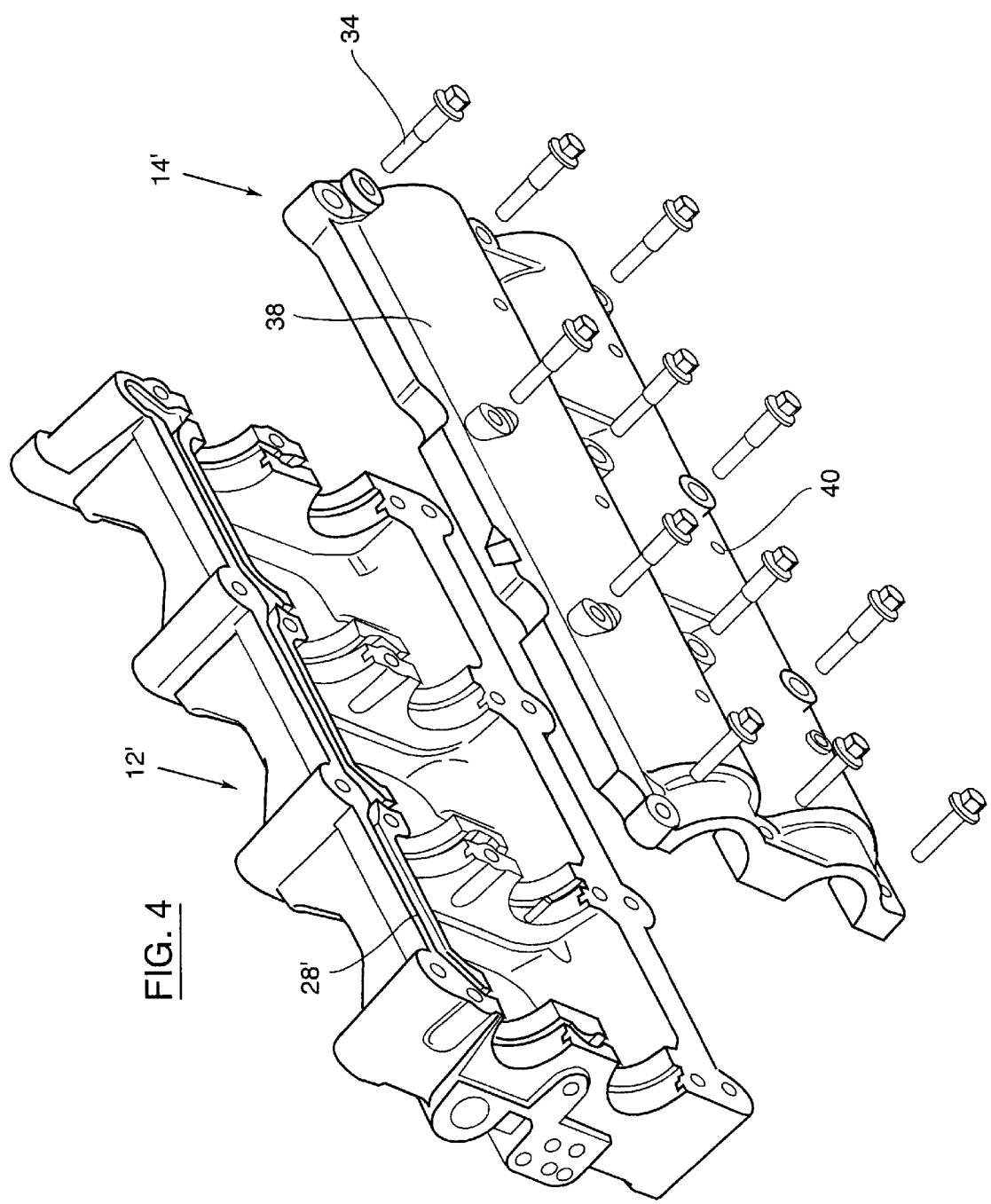
FIG. 4 shows a perspective exploded view from below of the housing only of a second embodiment of the invention.
Figure 5:
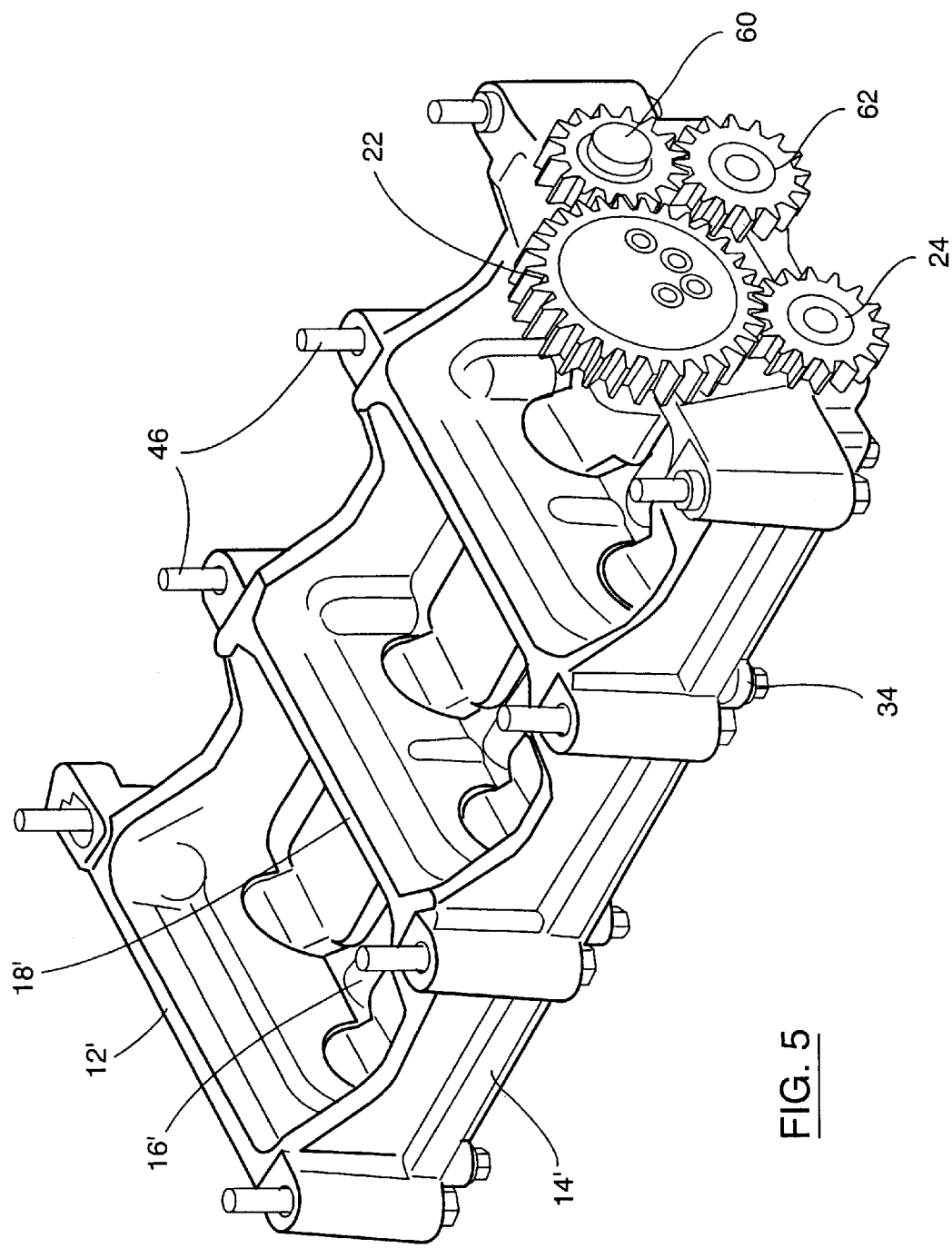
FIG. 5 shows the second embodiment of the invention when fully assembled.
Figure 6:
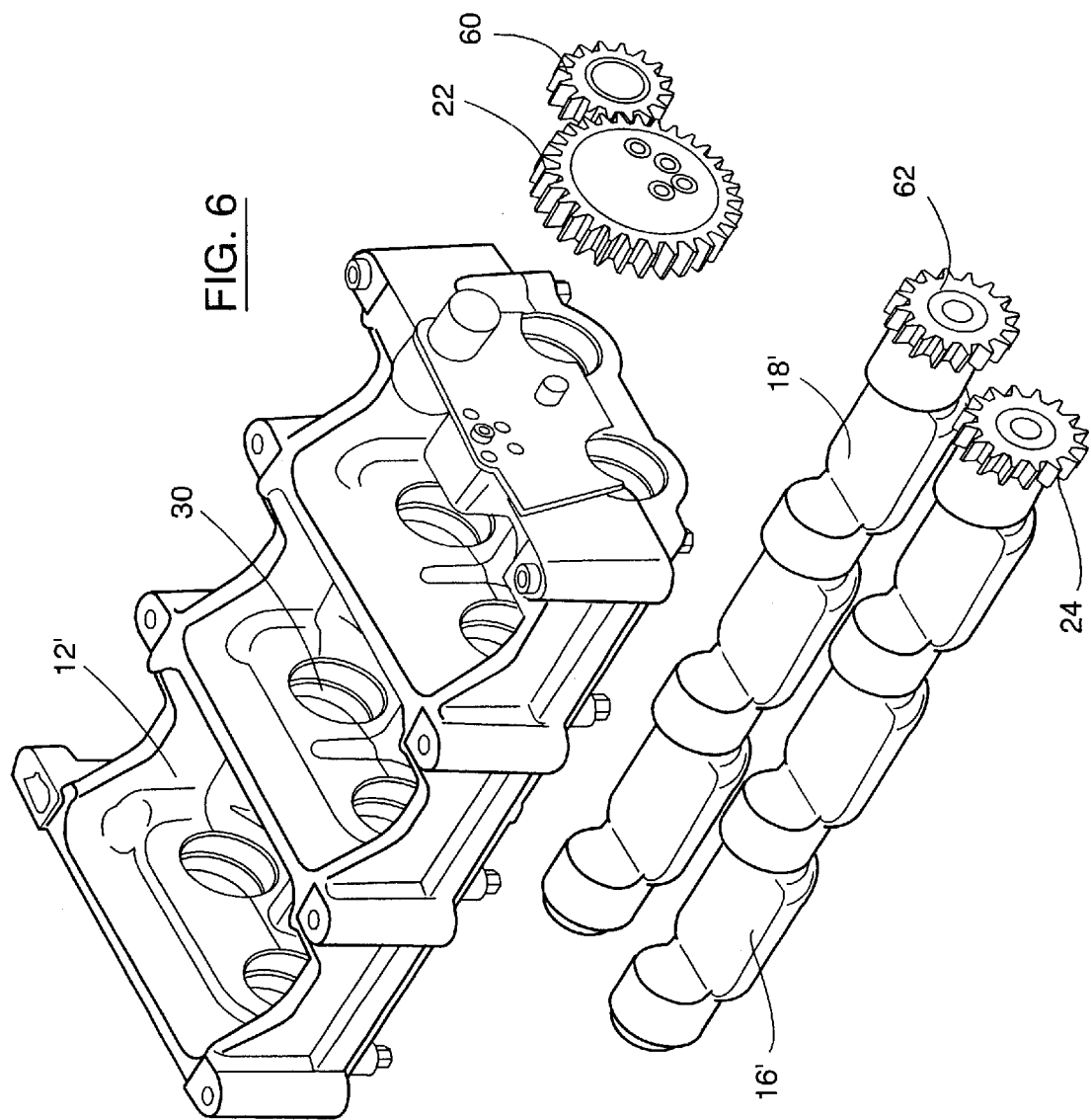
FIG. 6 is a perspective view of the separate components of the balancer assembly of the second embodiment of the invention.

The embodiment of FIGS. 4 to 6 is generally similar to that of FIGS. 1 to 3 and to avoid unnecessary repetition of their description, equivalent components have been allocated the same reference numerals, and a prime has been added to the reference numeral if a component has been modified.

The most obvious difference between the two embodiments is that the first and second balancer shafts 16' and 18' are identical to one another whereas the shafts 16 and 18 of the first embodiment are of different length. Furthermore, each of the shafts 16' and 18' has three eccentric weights so that the vibration load is spread more evenly between the bearings. The fact that the two balancer shafts 16' and 18' are identical reduces the number of different components used in the assembly and thus reduces manufacturing cost. When the journal sections of the shafts 16' and 18' are sufficiently large in diameter, the shafts 16', 18' may be cast, which further reduces manufacturing costs.

The second balancer shaft 18' has a drive cog 62 which is identical with the cog 24 on the first balancer shaft 16'. The two shafts therefore now need to be driven from the same end and for this reason an idler gear 60 is provided that meshes with the engine driven cog 22 and engages with the cog 62 to drive the second shaft 18' at the same speed as the first shaft 16' but in the opposite direction.

The lower housing part 14' is modified in that it is formed with webs 38 along its entire length as all sections of the balancer shafts between the bearings now carry eccentric weights.

In the embodiment of FIG. 1, the groove 28 is continuous around the periphery of the ladder network which results in oil being able to reach any one of the pillar blocks 30 by flowing clockwise or anticlockwise. It has been found that this redundancy can cause unnecessary drop in oil pressure and in the embodiment of FIGS. 4 to 6, as best shown in FIG. 4, an oil groove 28' is formed to extend only along one of the two stiles of the ladder network. Each of four spurs from the groove 28' extends along a respective one of the four rungs, to lubricate two pillar blocks which are arranged in series with one another along the spur.

Having thus described the invention, what is claimed as novel and desired to be secured by Letters Patent of the United States is:

1. A balancer shaft assembly for an engine, comprising a housing mountable on the engine block, and rotatably supporting at least one balancer shaft connectable for rotation with the engine crankshaft, the housing being formed and constructed in a two part open ladder frame and defining pillar blocks for journalling the or each balancer shaft, and characterised in that a groove is formed in the split plane of at least one of the two mating parts of the housing, which groove, when the parts are mated to one another, defines an oil gallery by way of which lubricant is supplied to the pillar blocks supporting the or each balancer shaft.

2. A balancer shaft assembly as claimed in claim 1, wherein the bottom half of the two part ladder frame housing is formed with reinforcing webs.

3. A balancer shaft assembly as claimed in claim 2, wherein two counter-rotating balancer shafts are provided.

4. A balancer shaft assembly as claimed in claim 3, wherein a first of the two shafts is driven at one end by means of a cog driven by the engine and the second balancer shaft is driven by means of a cog mounted on the opposite end of the first balancer shaft and meshing with an identical cog on the second balancer shaft.

5. A balancer shaft assembly as claimed in claim 3, wherein the two balancer shafts are identical with each other.

6. A balancer shaft assembly as claimed in claim 3, wherein the same ends of both balancer shafts are driven by means of an engine driven cog.

7. A balancer shaft assembly as claimed in claim 6, wherein a cog on the first shaft meshes directly with the engine driven cog and a cog is provided on the second shaft that is driven by the engine driven cog through an idler gear.

8. A balancer shaft assembly as claimed in claim 1 wherein oil galleries form a continuous closed loop around the periphery of the split plane, so that lubricant can flow along more than one path in order to reach any given balancer shaft bearing.

9. A balancer shaft as claimed in claim 1 wherein each rung of the ladder defines two pillar blocks, one for each balancer shaft, and wherein an oil gallery is formed in only one of the two stiles, the pillar blocks on each rung being connected to one another by a lubricant passage formed in the rung.

* * * * *